United States Patent Office 3,100,154
Patented Aug. 6, 1963

3,100,154
COATING COMPOSITION
Takeichi Oshima, 136 Idogaya-Nakamachi, Minami-ku, and Yukichi Uyemura, 420 Otamachi 4-chome, both of Yokohama, Japan
No Drawing. Filed Mar. 30, 1960, Ser. No. 18,518
Claims priority, application Japan Apr. 1, 1959
2 Claims. (Cl. 106—57)

The present invention aims to provide a coating composition suitable for forming superior coating on metal surface, which is tough and highly resistant to burning, exfoliation, color change and the like at an elevated temperature.

In most of the coating compositions for producing so-called heat-resistant coating hitherto known, there is usually employed as vehicle fluoroethylene plastics, epoxide-resins, silicon-resins or oil and fat, and accordingly the coating obtained therefrom would soon be subjected to burning, decomposition and exfoliation during thermal exposure of at the most 200–500° C. They can therefore not satisfactorily be used for coating of the articles made of iron and steel for which highly heat-resistant and anti-corrosive properties are required. Moreover, the known products are not practicable because of their expensiveness.

When applied on the articles of iron and steel such as, for example, engines, exhaust pipes, heat-absorbing pipe, cupola, electric heaters, gas burners, oil burners, stoves and chimneys, etc., the coating composition of the present invention produces a hardened coating which is maintained heat-resistant for a continuous heating for about 100 hours at temperature of 500°–900° C. and highly solvent-proof in contact with solvent such as, for example, gasoline, benzene, xylene, toluene, methanol, petroleum oils and the like.

The coating composition according to the present invention may be prepared by dissolving a metal salt including alkali metals of fatty acid such as zinc ricinoleate, sodium ricinoleate, zinc stearate, into an aqueous solution of sodium silicate; dispersing thoroughly zirconium silicate ($ZrSiO_4$) and comminuted silica ($SiO_2 \cdot nH_2O$) into the solution thus obtained, and admixing the suspension thus obtained with one or more of metals such as powdery zinc, and/or metallic oxides such as oxides of titanium, zinc, ferric antimony, stannic, lead, chromium, aluminum, nickel, cobalt, manganese and the like.

Alternatively, the same composition may be obtained when the aqueous sodium silicate solution above obtained is admixed with the metal powder and metallic oxide together with the zirconium silicate and comminuted silica above-mentioned. In this case, it is observed that if only the metal powder and metallic oxide were simply mixed with the sodium silicate solution, coagulation of the resulting mixture would take place in a short time, and there would be obtained an undesirable composition of inferior storability. The composition is too viscous to be worked and the film obtained therefrom is brittle and uneven and has an insufficient water-proofing property.

Unexpectedly, these disadvantages can be removed according to the present invention by the use of the particular aqueous sodium silicate solution which contains a metal salt of fatty acid such as ricinoleic or stearic acid as the suspending medium for the comminuted silica, and metal powder and metallic oxide.

The metal powder and metallic oxide generally tend, owing to their high specific gravity, to sedimentation in a short time when they are merely mixed with the sodium silicate solution. According to the present invention, as no sedimentation of the suspended materials does occur with a benefit of their good dispersible nature, there is thus obtained a coating composition of good workability.

A typical prescription for the production of particular coating composition of the present invention may be presented as follows, the percentage being by weight:

| | Percent |
|---|---|
| Metal salt of fatty acid | 1.5–2.5 |
| Zirconium silicate | 10–15 |
| Comminuted silica | 5–10 |
| Metal powder | 15–30 |
| Metal oxide | 15–30 |
| Sodium silicate | 15 |
| Water | Balance |
| Total | 100.0 |

As suitable fatty acid to be employed, there may be mentioned those which contain 16 to 18 carbon atoms.

The following example illustrates the invention:

| | G. |
|---|---|
| Zinc ricinoleate | 2 |
| Zinc stearate | 1 |
| Sodium metasilicate (38° Bé.) | 30 |
| Zirconium silicate | 10 |
| Comminuted silica | 10 |
| Water | 47 |

In producing the composition of the foregoing example, an aqueous solution is first prepared by adding water to sodium metasilicate followed by heating to a temperature of about 60° C. Zinc ricinoleate and zinc stearate are then gradually introduced to the solution with stirring, and when the dissolution of the solid substances added is completed, the resulting solution is mixed with zirconium silicate and comminuted silica. The whole is then worked on a homogenizer to secure a sufficient dispersion.

To 70 g. of the dispersion thus obtained, are added 30 g. of powder metallic zinc, or of one or more metal oxides, such as chromium oxide, ferric oxide or the like, or a mixture of 15 g. of the metal powder and 15 g. of the metallic oxide, both as above-mentioned in portions and the mixture is blended thoroughly with stirring. The mixture is milled on rollers until a homogeneous and thick liquid is obtained, which is then passed through a percolator. There is finally obtained a finely and intimately dispersed pasty coating composition.

The pasty coating composition according to the invention may be applied on fresh surfaces of steel or iron articles which have been cleaned by degreasing with an alkaline solution, tri-chloroethylene or the like, pickling followed by polishing with sand-blast or grinding, by conventional means such as brushing or gun-spraying, and dried for 20–30 minutes at temperature of about 50–60° C. In this case, it is noticed that if the drying was carried out at a higher temperature immediately after the application of the coating composition, there was obtained an undesirable uneven coating owing to foaming. The coated material is then baked for 20–30 minutes at 100–150° C. The resulting coating may be strengthened, if possible, by subjecting the same to a heat-treatment at 200–300° C.

The excellent stability of the resulting coating against heat, water, saline water, oil and bending have been proved as follows.

(A) Heat-stability test:
(1) Automobile engine, manifold and flexible tube were coated with the coating composition of the invention, and the coating was dried at 90° C. for 20 minutes. The coating obtained was continuously heated at 900° C. for 100 hours. There was no burning, exfoliation, nor color change.
(2) Heat-stability test in an electric furnace. A piece of steel was coated with the coating composition and dried at 80° C. for 20 minutes. The results observed were as follows:
Heating at 100° C.: After 10 minutes' heating no burning and exfoliation of the coating were observed.
Heating at 650° C.: After one hour's heating, burning and exfoliation were observed.
Heating at 500° C.: After eight hours' heating, burning and exfoliation were observed.

(B) Test for resistance to solvent: An amount of each of gasoline, benzene, toluene, xylene, methanol and spindle oil was taken in a beaker. A piece of coated steel plate, which has been prepared by degreasing and polishing the surface of plate and applying the composition according to the invention and drying at 100° C. for half an hour, was placed in the beaker respectively, and allowed to stand.

After 180 days, weight of each of the pieces, state of the coating and the matter dissolved out from the coating were determined, and no appreciable changes were observed.

(C) Bending test: A coated wire of 3 mm. in diameter was bent at an angle of 180 degrees. There was no failure in the test.

(D) Weather test by using weather-meter:
(1) Irradiation was carried out for 100 hours using two special lamps.
(2) Sprinkling 120 minutes with No. 1 nozzle under hydraulic pressure of 0.6–1.0 kg./cm.$^2$, inner temperature of the apparatus was 45° C. In these experiments, there occurred no swelling, exfoliation, rusting and color change of the coating.

(E) Saline water sprinkling test: The saline water employed was as follows—

| | |
|---|---|
| Sodium chloride used | Reagent degree "No. 1." |
| Water | Purified by the aid of an ion-exchange resin. |
| pH value | 6.6–7.0. |
| Concentration | Adjusted to 5±0.1%. |
| Pre-treatment | Degreased and washed with water. |
| After-treatment | Washed with water and dried at 35±1° C. |
| Pressure | 16±0.5 lb./in.$^2$. |
| Average amount taken | 0.7–1.5 cc./80 cm.$^2$/hr. |
| Result | No change of the coating was observed after the lapses of 24, 48, 53, 72, 80, 96 and 120 hours, respectively. |

What we claim is:
1. A refractory, solvent-proof and anti-corrosive coating composition consisting of 1.5 to 2.5% by weight of a metal salt of a fatty acid dissolved in an aqueous solution of 15% by weight of sodium silicate, 10 to 15% by weight of comminuted zirconium silicate, 5 to 10% by weight of comminuted silica, and 15 to 30% by weight of a metallic oxide admixed therewith.

2. A refractory, solvent-proof and anti-corrosive coating composition consisting of 1.5 to 2.5% by weight of a metal salt of a fatty acid dissolved in an aqueous solution of 15% by weight of sodium silicate, 10 to 15% by weight of comminuted zirconium silicate, 5 to 10% by weight of comminuted silica, and 15 to 30% by weight of a metallic oxide admixed therewith, said fatty acid being selected from the group consisting of ricinoleic acid and stearic acid, and said oxide being an oxide of a member of the group consisting of titanium, zinc, iron, antimony, tin, lead, chromium, aluminum, nickel, cobalt, and manganese.

References Cited in the file of this patent

UNITED STATES PATENTS

| | | |
|---|---|---|
| 1,944,008 | Hobart | Jan. 16, 1934 |
| 2,084,825 | Ruben | June 22, 1937 |
| 2,311,272 | Ware | Feb. 16, 1943 |

FOREIGN PATENTS

| | | |
|---|---|---|
| 596,341 | Great Britain | Jan. 1, 1948 |

OTHER REFERENCES

Serial No. 426,245, Passelecq (A.P.C.), published June 1, 1943.